W. C. RIFFE.
Bee-Hive.

No. 208,851.  Patented Oct. 8, 1878.

Attest:
H. D. Perrine
Floyd Harris

Inventor:
William C. Riffe
By Johnson & Johnson
Attys.

UNITED STATES PATENT OFFICE.

WILLIAM C. RIFFE, OF MORTON, MISSOURI, ASSIGNOR TO SERENA TEMPLE RIFFE, OF SAME PLACE.

IMPROVEMENT IN BEE-HIVES.

Specification forming part of Letters Patent No. 208,851, dated October 8, 1878; application filed March 12, 1878.

*To all whom it may concern:*

Be it known that I, WILLIAM C. RIFFE, of Morton, in the county of Ray and State of Missouri, have invented certain new and useful Improvements in Bee-Hives; and I do hereby declare that the following is a full, clear, and exact description thereof, which will enable others skilled in the art to which it appertains to make and use the same, reference being had to the accompanying drawings, and to letters of reference marked thereon, which form a part of this specification.

I construct a bee-hive moth-proof without resorting to objectionable and expensive traps, hitherto resorted to, for excluding moths or millers from bee-hives.

To this end the invention consists in having an entrance for the bees of such form or construction that their ingress and egress can take place in an easy manner, and the miller be excluded by a simple arrangement of beveled or inclined alighting-boards, or surfaces having sharp edges, which offer no impediment to the free and easy entrance of the bees, but will, by reason of the shape or formation of the miller, afford no hold for the same, and thus render his attempts to enter the hive futile and his entrance impossible.

Figure 1:
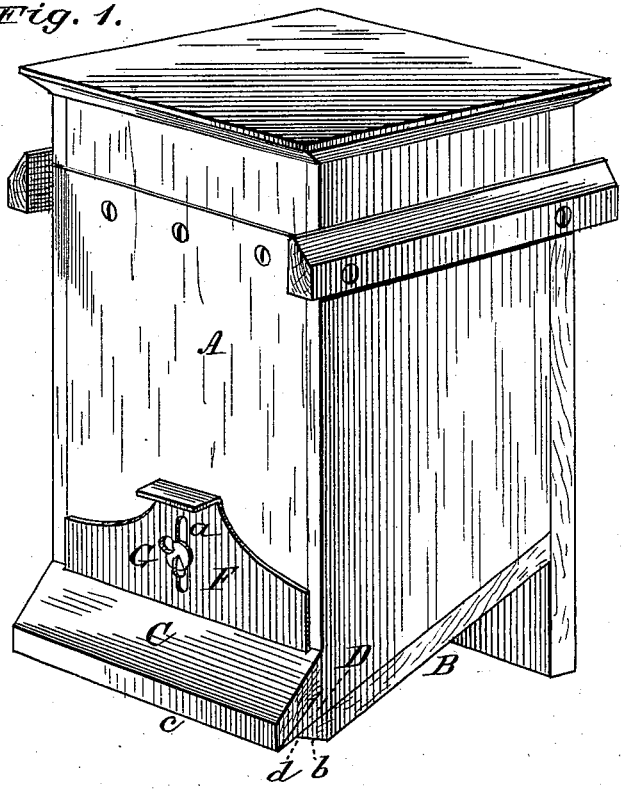
Figure 2:
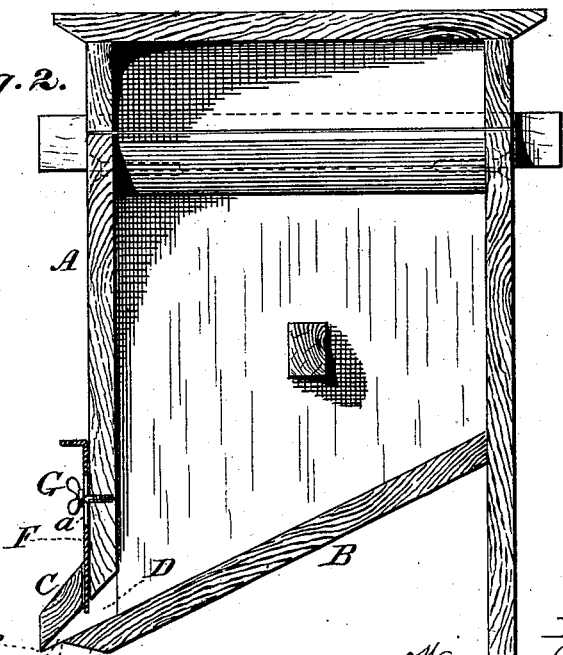

In the drawings, Figure 1 represents a bee-hive having inclined bottom or floor and my novel bee-entrance, and Fig. 2 a vertical section of the same.

In the present instance I have illustrated a bee-hive, A, of the ordinary construction so far as the arrangement of the honey and brood chambers and boxes is concerned. It is hung or suspended in a frame made for that purpose. The bottom B of the hive is made inclined or sloping, and projects beyond the front wall of the hive one and a half inch. This projecting portion is beveled on its under side in an upward direction to a feather-edge, as is shown at *b*.

To the front wall of the hive is attached an inclined board or strip, C, which is made longer than the beveled projecting portion of the bottom B, so as to overhang or project beyond the latter one-half inch. This inclined board C rests upon wedge-shaped or triangular filling-pieces D at each end, inserted between said board C and the bottom of the hive, thus closing the ends of the space formed between these parts.

The entrance E extends the entire width of the hive, and is formed between the projecting portion of the bottom and the overhanging inclined board C, and is one-half inch, scant, in width. The front edge of the board C is almost or entirely vertical or perpendicular. Between the front wall of the hive and the inclined board C is arranged a tin sliding door or plate, F, which can be raised or lowered for varying the size of the bee-entrance, or for closing the same entirely.

In hiving or swarming the bees, or for imprisoning the "queen" of a new swarm, said door is removed from the hive. As the queen cannot pass out where the bees can, this keeps them at home. The thumb-screw G passes through a slot, *a*, in said plate, and is used for setting or retaining the door at any desired height and allow it to be removed.

The rationale of my invention is as follows, viz: By the peculiar or particular formation of the miller it is unable to creep over angles such as are formed by the sharp edge of the boards or surfaces forming my bee-entrance, and thus it will be excluded from the hive in a perfect and simple manner. The bees, on the contrary, can freely enter the hive by flying directly into the slot or the entrance proper. The approaches thereto are the overhanging board and the bottom having projecting beveled front portion. The bees, when they alight on the front edge of the entrance, pass over the overhanging sharp edge *c* and enter with their backs down, and if they alight on the bottom beveled edge they go in with their backs up over the sharp edge *d*. The miller, by reason of the feelers on the side of its head, is prevented from flying directly into the slot forming the entrance, and its legs or claws are also not shaped so as to enable it to crawl over either sharp edge to the entrance. The dust or pollen on the miller and the absence of flesh claws on his legs will not permit him to crawl on anything but a smooth plane; and this at least is certain, he cannot overcome the barriers or obstacles offered by the sharp angles and gain an entrance into the hive.

I have demonstrated the fact that in no instance has the miller been enabled to enter a hive having my form of entrance. Its habits and its endeavors to enter my hive have been closely observed and studied; in consequence whereof I have arrived at the conclusion that a bee-hive of my construction is perfectly moth-proof, and this without the use of traps and other devices heretofore employed for the same purpose.

I claim—

In a bee-hive, the bottom B, extending beyond the front wall of the hive, and having a beveled or inclined under surface, $b$, with sharp termination $d$, and the inclined front board or strip, C, overhanging said bottom by a sharp termination, $c$, so as to form an entrance-slot for the bees, substantially as and for the purpose set forth.

In testimony that I claim the foregoing I have affixed my signature in the presence of two witnesses.

WILLIAM COFFEE RIFFE.

Witnesses:
   WILLIAM DAVID RICE,
   BENJAMIN WIGGINTON.